No. 769,796. PATENTED SEPT. 13, 1904.
W. A. GILMER.
WHEEL CONSTRUCTION.
APPLICATION FILED MAR. 17, 1904.
NO MODEL.

Witnesses
K. Barry
C. E. Richter.

Inventor
W. A. Gilmer
By W. T. Fitz Herald
Attorneys.

No. 769,796. Patented September 13, 1904.

UNITED STATES PATENT OFFICE.

WILLIAM A. GILMER, OF NEAR BROADVIEW, TENNESSEE, ASSIGNOR OF ONE-HALF TO J. E. ROAN, OF COLUMBIA, TENNESSEE.

WHEEL CONSTRUCTION.

SPECIFICATION forming part of Letters Patent No. 769,796, dated September 13, 1904.

Application filed March 17, 1904. Serial No. 198,680½. (No model.)

*To all whom it may concern:*

Be it known that I, WILLIAM A. GILMER, a citizen of the United States, residing near Broadview, in the county of Maury and State of Tennessee, have invented certain new and useful Improvements in Wheel Constructions; and I do hereby declare the following to be a full, clear, and exact description of the invention, such as will enable others skilled in the art to which it appertains to make and use the same.

My invention relates to wheel construction, and more particularly to the hub of the wheel; and my invention consists of certain novel features of combination and construction of parts, the preferred form or materialization whereof will be hereinafter clearly set forth, and pointed out in the claim.

The prime object of my invention, among others, is to provide a hub of such character that the parts thereof will be of simple though reliably efficient character and the said parts may be readily separated from each other and from engagement with the inner ends of the spokes, whereby any broken spoke may be quickly removed and replaced without in any wise disturbing the tire or the felly.

A further object of my invention is to so form the hub proper that the inner ends of the spokes will be engaged and reliably clamped together, and thus held against any relative movement and at the same time will protect the ends of the spokes from shrinking and swelling by excluding therefrom all dampness.

A further object of my invention is to provide a boxing proper which may be easily removed and replaced as desired.

Other objects and advantages will be hereinafter made clearly apparent, reference being had to the accompanying drawings, which are made a part of this application, and in which—

Figure 1:
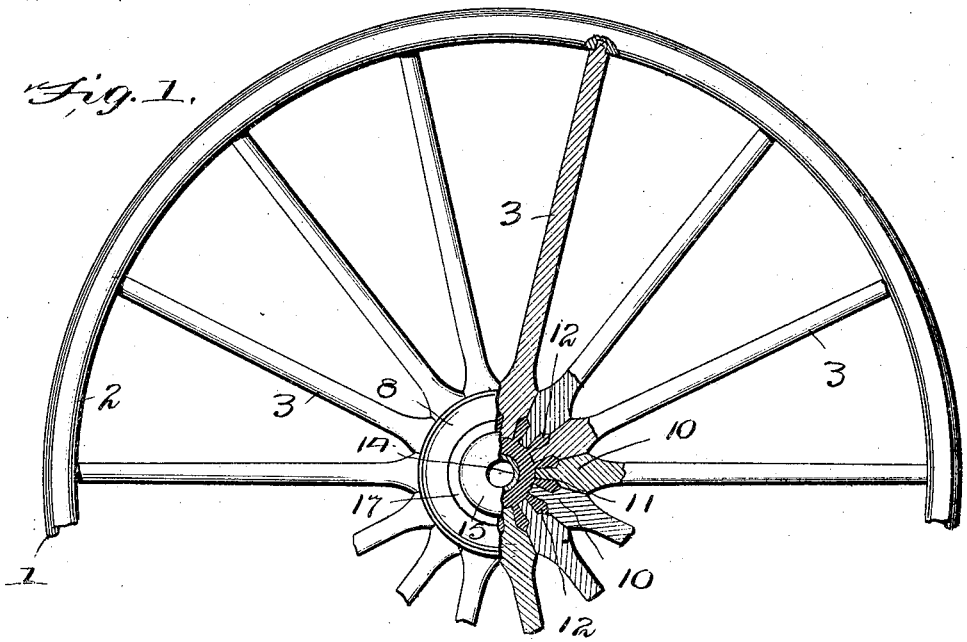
Figure 2:
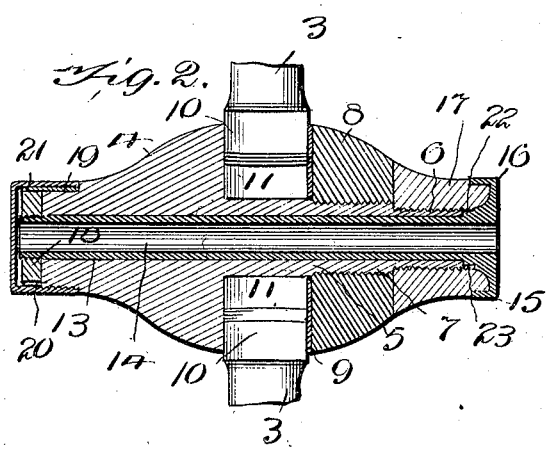
Figure 3:
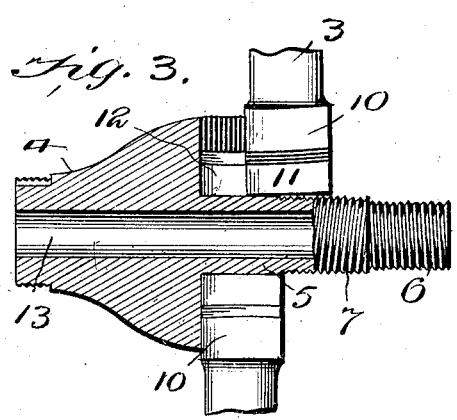
Figure 4:
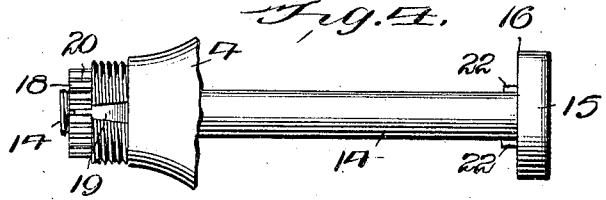

Figure 1 shows a side elevation of a portion of a wheel, illustrating the hub and part of the spokes coöperating therewith in section. Fig. 2 is a longitudinal sectional view of my hub complete and also showing the relative position of some of the spokes coöperating therewith. Fig. 3 is a similar view showing a portion of the hub and showing one of the spokes partly withdrawn from its seat. Fig. 4 is a detail view showing the boxing proper of my hub, which is also employed for holding the separable parts of the hub proper in union with each other.

In order to conveniently refer to the various details and coöperating accessories of my invention, numerals will be employed, the same numeral referring to a corresponding part throughout the several views.

Referring to the numerals on the drawings, 1 designates the tire, and 2 the felly, of a wheel, which may be of the usual or any preferred construction, while 3 designates the spokes of the wheel, the outer ends of which are seated in the usual manner in the felly, while the inner ends thereof are placed in coöperation with the hub of the wheel.

My improved hub consists of the main member or body portion proper, 4, which, as will be observed by reference to Figs. 2 and 3, is provided with an integral tubular extension 5, the extreme outer end of which is provided with a threaded terminal, preferably right-hand threads, as indicated by the numeral 6, while the section of the tubular extension immediately adjacent to the threaded section 6 is provided with left-hand threads, as designated by the numeral 7, for a purpose hereinafter clearly set forth. Upon the threaded sections 7 I dispose the auxiliary hub-section 8, which is provided with a threaded bore of sufficient size to be received by said threaded section, and when the auxiliary hub member 8 is thus turned toward the left it will be brought squarely against the outer edges of the spokes 3 or the gasket or washer 9, interposed between them. By reference to Fig. 1 it will be seen that the inner end of each of the spokes is wedge-shaped, as designated by the numeral 10, and after said wedge-head-like member 10 is formed the extreme inner end of said wedge is reduced in size, as designated by the numeral 11, said reduced extension 11 having either parallel sides or said sides may be dovetailed in form, so that the extreme inner end of the spoke will be slightly greater in width than that point where the extension 11 is joined to the wedge-section 10.

The body portion 4 is so formed that it will be provided with a plurality of the partition members 12, which are largest at their outer edges, whereby they will receive between them the extensions 11 on the extreme inner ends of each of the spokes. In some instances the partition members 12 may be split longitudinally, so as to receive a compensating wedge if it should ever become desirable to compensate for any shrinkage of the terminals 11 of the spokes, or every one or every other one of said partition members may be so provided to receive a wedge, though I reserve the right to make them solid or split, as I may deem most desirable in practice. It is therefore obvious that any of the spokes may be readily entered in place between its respective partition members 12 or removed therefrom without necessitating the removal of the felly or tire from the wheel.

Inasmuch as the inner ends of each of the spokes while being removed from its seat would swing in a radius of a circle, I form the outer edges of the partition members 12 correspondingly, so that their outer faces will therefore be slightly concave, as clearly illustrated in Fig. 3, it being necessary to only very slightly curve the meeting faces of the partition member 12 and the corresponding offset formed upon the inner end of the wedge terminals 10, as will be readily understood.

A suitable bore 13 is provided in the hub member 4 to receive the boxing 14, which may be of any preferred size and character to meet all the varying requirements of a wheel-hub, and said boxing is provided with a bore of proper shape to receive the spindle of the axle, as will be obvious. The boxing 14 is provided at one end with the cap-like terminal 15, having the inwardly-directed flange 16, designed to fit around the end of the tapered section or hub-terminal 17 and impart a desirable finish thereto, said hub-terminal being provided with a threaded bore to be properly received by the threaded terminal 6 before described. The opposite end of the boxing 14 is threaded to be engaged by the locking-disk 18, which is adapted to fit directly against the extreme tapered end of the hub member 4, and when turned home upon its threaded seat upon the boxing 14 it is held against casual reverse rotation by the locking-finger 19, resting in a recess or groove 20, provided in the face of said disk. The locking-finger and the disk 18 are wholly inclosed and hidden from view by the cap 21, which is screwed home upon a suitable seat provided upon the body portion 4, as clearly shown in Figs. 2 and 3.

By the construction and arrangement of parts which I have hereinbefore presented and illustrated in the accompanying drawings it will be seen that I have provided a hub of reliably efficient character composed of a few simple coöperating parts which may be readily separated and easily restored each to its respective operative position. It is furthermore obvious that when any of the spokes become damaged and it is desirable to replace the same by a new spoke all that is required is to remove the cap 20 and the locking-disk 18 and withdraw the boxing 14 and then remove the parts 8 and 17, when any of the spokes may be quickly withdrawn from its seat and a new one entered therein and said parts then restored each to its respective place, when the wheel will be practically as good as new, all of which is accomplished without the necessity of removing the tire and the felly from the outer ends of the spokes.

In order to prevent the boxing 14 from turning while the locking-disk 18 is being turned thereon, I have provided suitable lugs 22, which are adapted to take into recesses 23 and in the end of the tubular extension 5.

Having thus fully described the construction and manner of applying my invention to use, further description is deemed unnecessary, and while I have described the preferred combination and construction I desire to comprehend such substantial equivalents and substitutes as may be considered as falling fairly within the scope of my invention.

What I claim as new, and desire to secure by Letters Patent, is—

The herein-described wheel construction comprising the hub member 4 having a tubular extension 5, sections of the outer ends of which are oppositely threaded; an auxiliary hub-section 8 fitting upon said tubular extension, the body portion 4 having a plurality of seats for each of the inner ends of all the spokes; a hub-terminal 17 fitting upon the tubular extension 5 with threads disposed oppositely from the threads coöperating with the member 8; a boxing passing through the hub-section, said boxing having upon one end the cap-like terminal 15 engaging the hub-terminal 17 and upon its opposite end a locking-disk 18 and means to hold said locking-disk in a locked position whereby the spokes will be securely held in their seats but may be individually removed therefrom as desired without removing the felly or tire all combined substantially as specified and for the purpose set forth.

In testimony whereof I have signed my name to this specification in the presence of two subscribing witnesses.

WILLIAM A. GILMER.

Witnesses:
J. E. HENDERSON,
M. E. COURTNEY.